United States Patent Office 3,006,543
Patented Oct. 31, 1961

3,006,543
FIRE CONTROL COMPUTER
George A. Crowther, Manhasset, N.Y., assignor to Sperry Rand Corporation, Ford Instrument Company Division, Wilmington, Del., a corporation of Delaware
Filed Nov. 13, 1958, Ser. No. 773,667
9 Claims. (Cl. 235—61.5)

This invention relates generally to a small, simple, portable instrument for accurately computing the basic data for directing gun fire. The instrument is of the slide rule type and was especially designed for use by gunnery officers, on ships not equipped with automatic mechanical computers, for quickly determining the approximate gun laying angles, for guns and ammunitions of known ballistic characteristics, when firing from ship to ship or from ship to shore. More specifically the invention relates to an apparatus for simulltaneously solving two equations, the answers to which are read directly from the instrument, when the instrument is manually set in accordance with certain known factors. One of the equations determines the sight, or angle of elevation at which the gun must be set, and the other equation determines the horizontal, or deflection angle, at which the gun must be set. In order to properly set the instrument the following facts must be known: the speed and direction of travel of the ship on which the gun is mounted with respect to the target, the speed and direction of travel of the target ship with respect to the gun ship, the range or distance between the two ships, and the speed and direction of the wind with respect to the bearing of the gun ship.

As shown herein the instrument comprises an elongated relatively narrow thin rectangular base plate which is provided with suitable downwardly extending legs for supporting the instrument on a table or the like in spaced relation thereto. The base plate is provided with three longitudinally spaced dial assemblies which may be termed the gun dial, the wind dial and the target dial assemblies. The gun dial assembly is disposed at one end of the base plate and the wind dial assembly is disposed at the opposite end of the base plate, with the target dial assembly interposed therebetween. Each dial assembly comprises a fixed rotatably mounted member and a longitudinally shiftable member having cooperating scales thereon.

The gun dial assembly is provided with a scale calibrated in degrees for indicating the relative gun ship bearing, a scale calibrated in knots for indicating the speed of the gun ship, and a scale calibrated in seconds for indicating the time of flight of a projectile between the gun ship and a target ship.

The wind dial assembly is provided with a scale calibrated in degrees for indicating the relative gun ship bearing, a scale calibrated in knots for indicating the apparent wind speed, a scale calibrated in degrees for indicating the apparent wind direction, a range wind scale and a wind deflection scale both of which are calibrated in knots.

The target dial assembly has a scale calibrated in degrees for indicating the relative target ship bearing, a scale calibrated in knots for indicating the speed at which the target ship is moving, and a scale calibrated in seconds for indicating the time of flight of a projectile between the gun ship, and target ship.

The under surface of the base plate is provided with a longitudinally extending scale which is calibrated in yards for indicating the range of the target, and a cooperating transversely extending wind range scale which is calibrated in knots. The longitudinally shiftable element of the target dial assembly has an under-slide secured thereto which extends transversely of the base plate adjacent the underside thereof. The shiftable element and the under-slide are longitudinally movable in unison, and the under-slide is provided with an enlarged rectangular aperture in which a longitudinally movable plate is mounted. The plate is provided with an index line which cooperates with both the target range scale and the wind range scale in setting the target dial means in accordance with readings taken from the wind dial assembly and the known target range.

The upper surface of the base plate is provided with an elongated thin narrow inset plate having a longitudinally extending wind deflection scale which is calibrated in knots, and by which the target dial assembly is further set in accordance with readings taken from the wind dial assembly.

A ballistic protractor assembly is provided which cooperates with the gun dial assembly and the target dial assembly in indicating the sight and deflection angles for the gun in accordance with the various settings of the instrument. The protractor assembly comprises a circular protractor disk having an elongated protractor arm extending longitudinally outwardly therefrom over and past the target dial assembly. The protractor disk is rotatably mounted in a complementary arcuate supporting section of a holder which is carried by a longitudinally shiftable slide block which is mounted on the base plate below the gun dial assembly. The connection between the holder and the slide is such that the holder may be shifted transversely of the block but not longitudinally thereof. The protractor disk is provided with an index mark which cooperates with a scale on the holder for indicating the deflection angle, and the protractor arm is provided with a scale which cooperates with indicia on the target dial assembly for indicating the sight angle.

The principal object of the invention is to provide a gun fire computing instrument of the slide rule type having certain elements which can be quickly and easily manually set to determine the sight and deflection angles of a gun when firing at a given target.

Another object of the invention is to provide a gun fire computing instrument of the aforesaid character in which the sight and deflection angles can be read directly from the instrument without calculation.

Another object of the invention is to provide in an instrument of the aforesaid character means by which the instrument may be further set to compensate for an observed error in the landing of a shell with respect to the target.

Another object of the invention is to provide an instrument of the aforesaid character which is efficient in operation, is of simple construction and is inexpensive to manufacture.

Having stated the principal objects of the invention, other and more limited objects will be apparent from the following specification and the accompanying drawing forming a part thereof in which.

Referring now in detail to the drawings by reference characters, numeral 1 indicates generally a gun fire computing instrument of the slide rule type having an elongated rectangular base plate 2 which is provided with the downwardly extending legs 3 by which the instrument 1 is supported on a table or other suitable support in vertically spaced relation thereto. The base plate 2 has a gun dial assembly, generally indicated by the numeral 4, mounted thereon at one end thereof, a wind dial assembly, generally indicated by the numeral 5, mounted thereon at the opposite end thereof, and a target dial assembly 6 mounted thereon intermediate the gun dial assembly 4 and the wind dial assemly 5. A thin plate 7 which is inset in the upper face of the base plate 2 has a wind deflection scale 8, calibrated in knots, thereon which cooperates with the target dial assembly in setting it in accordance with the readings of the wind dial assembly 5. The underside of the base plate 2 is provided with a longitudinally extending scale 9, calibrated in yards, for indicating the range between the gun ship and the target ship, and a cooperating transversely extending range wind scale 10, which is calibrated in knots, for further setting the target dial assembly in accordance with reading from the wind dial assembly, and the known range between the gun and the target.

The base plate 2 also has a protractor assembly, generally indicated by the numeral 11, mounted thereon which cooperates with the gun dial assembly 4 and the target dial assembly 6 for indicating the deflection and sight angles of the gun in accordance with the settings of the gun dial, wind dial and target dial assemblies.

Figure 1A:
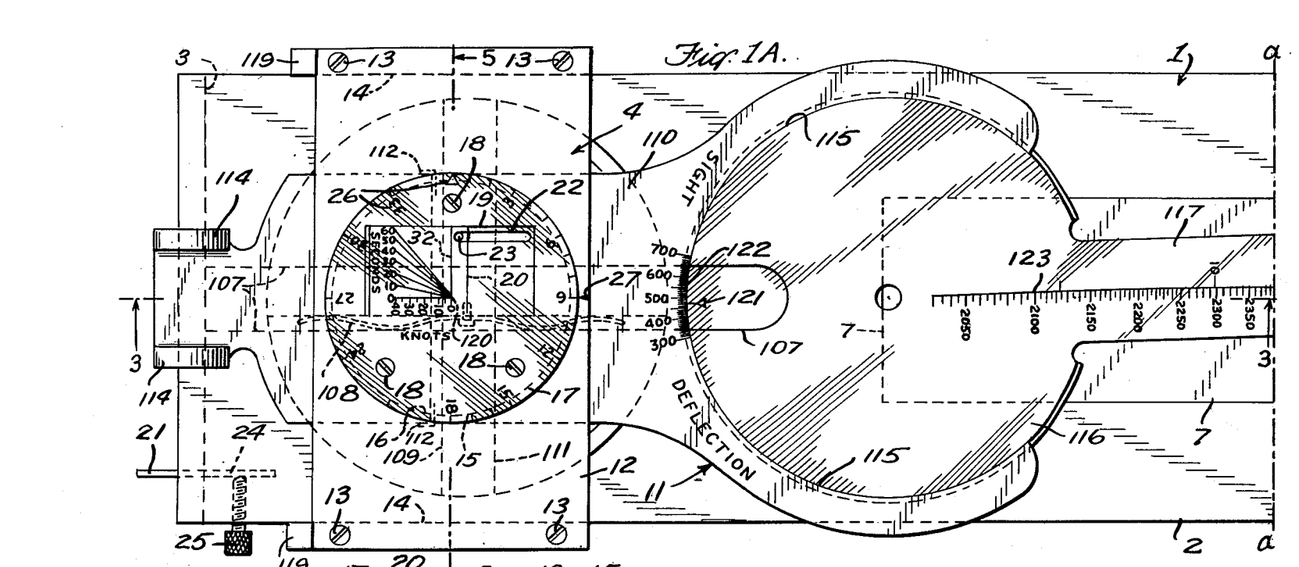
FIGS. 1A, 1B and 1C joined together on the lines a—a and b—b constitute a top plan view of a gun fire computing instrument constructed according to my invention.
Figure 1B:
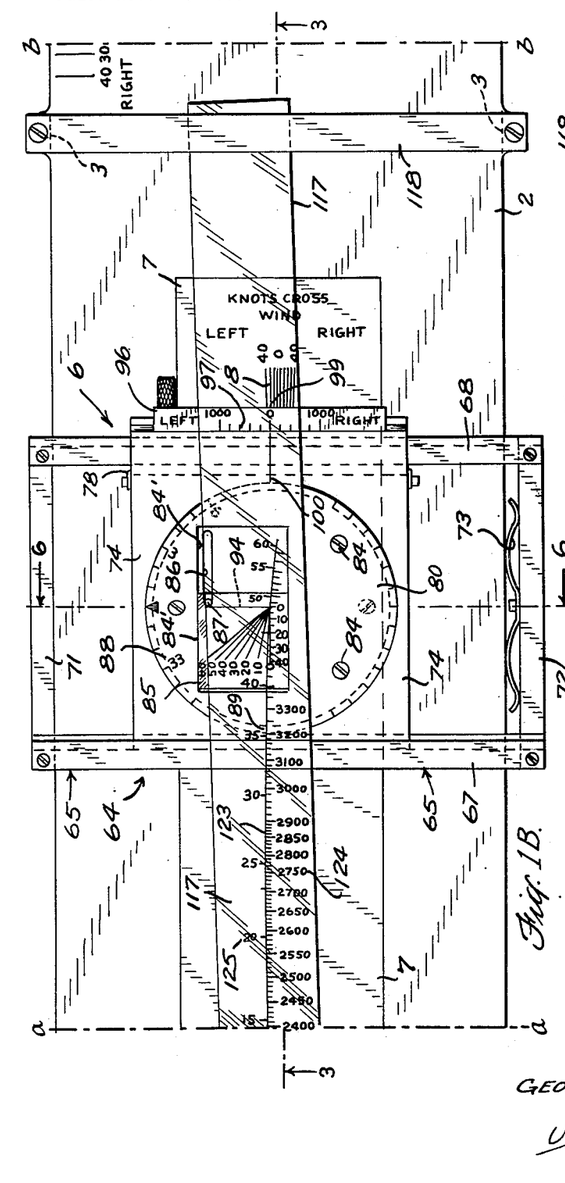
Figure 1C:
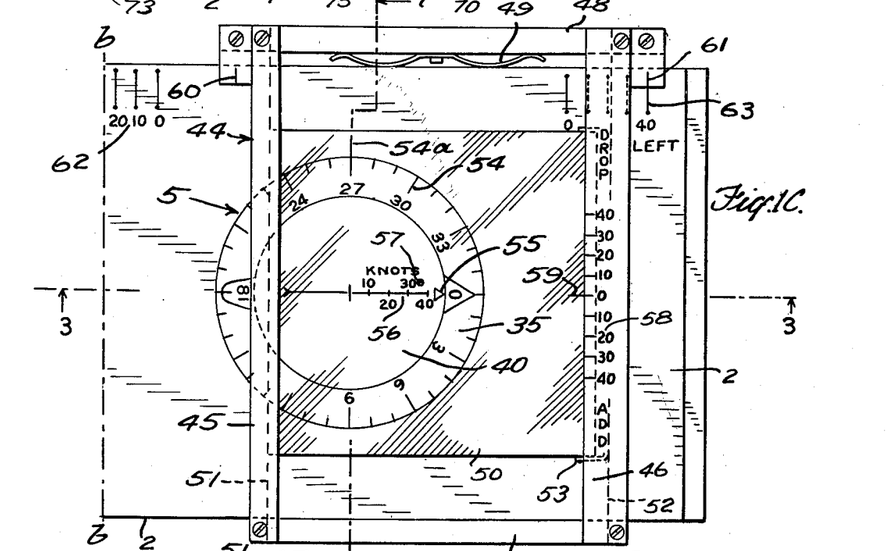
Figure 2A:
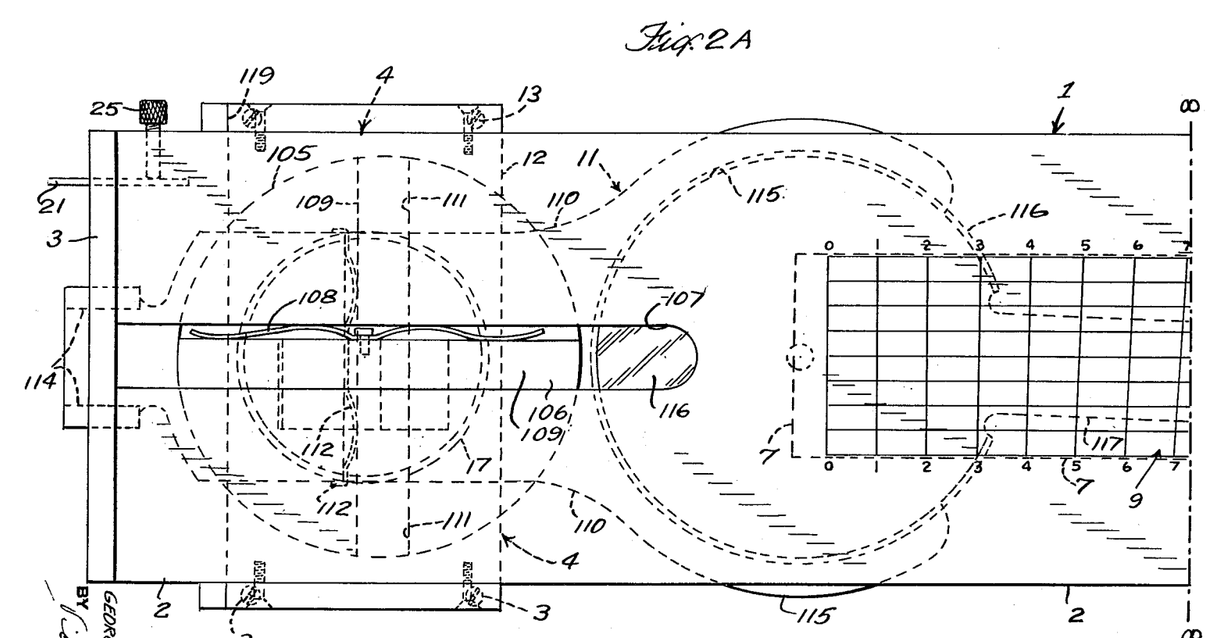
FIGS. 2A, 2B and 2C connected together on the lines a—a and b—b constitute a bottom plan view thereof.
Figures 2B, 4:
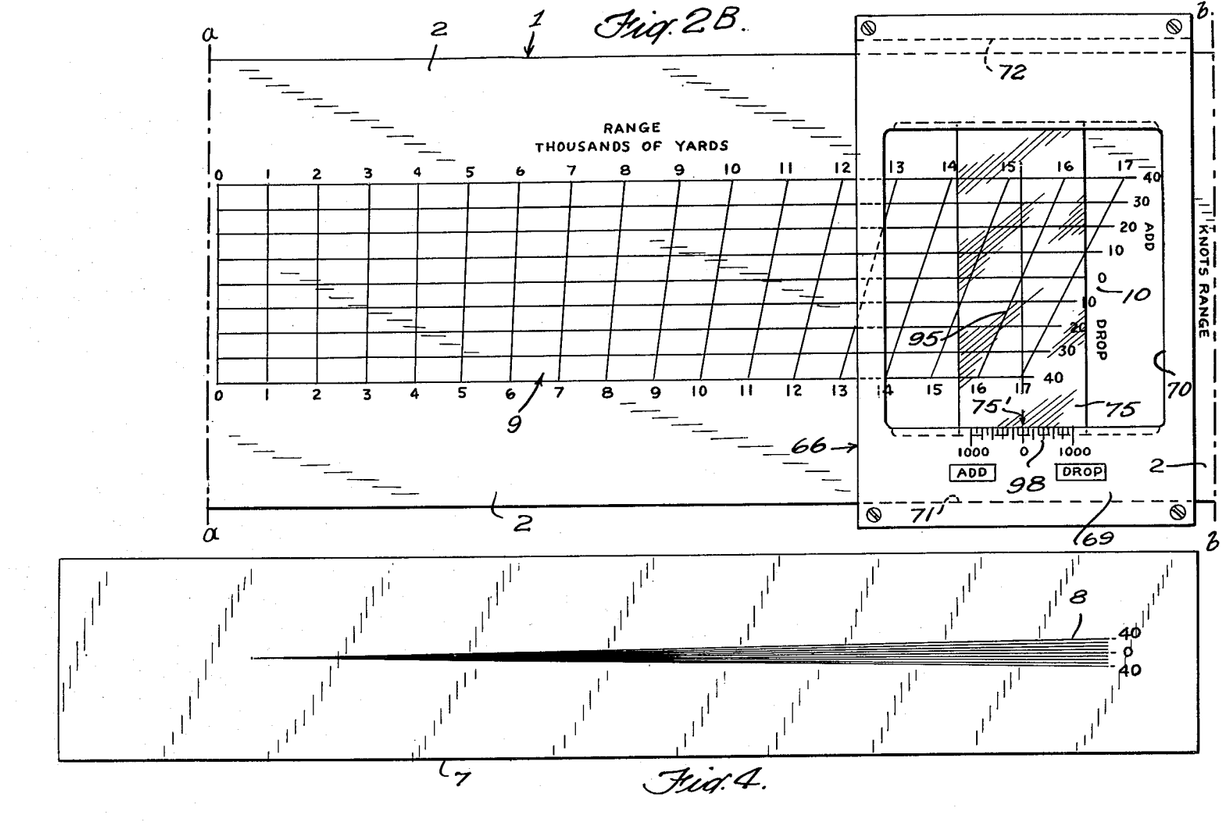
FIG. 4 is a fragmentary plan view showing the wind deflection scale associated with the target dial assembly.
Figure 2C:
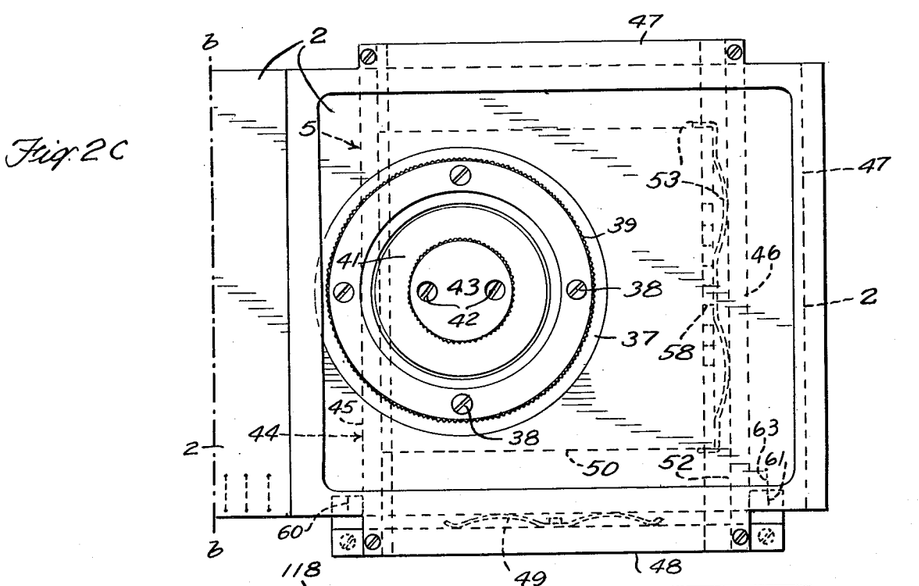
Figure 3A:
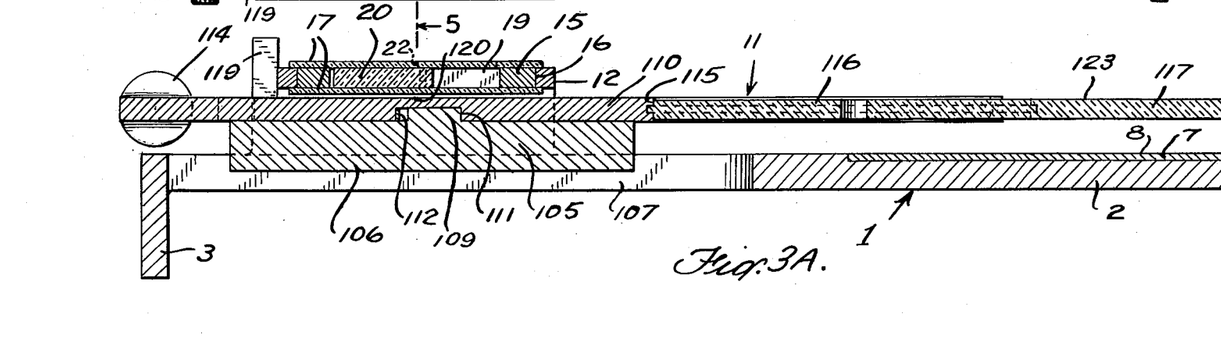
FIGS. 3A, 3B and 3C connected together on the lines a—a and b—b constitute a central longitudinal vertical section through the instrument, the plane of the section being indicated by the line 3—3 on FIGS 1A, 1B and 1C.
Figure 3B:
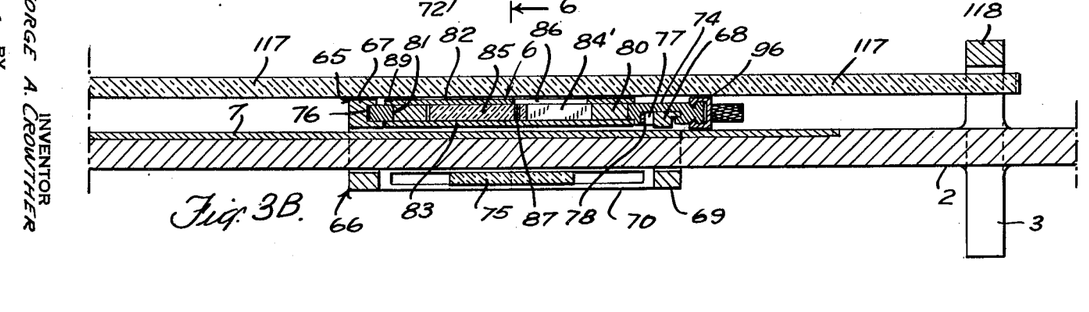
Figure 3C:
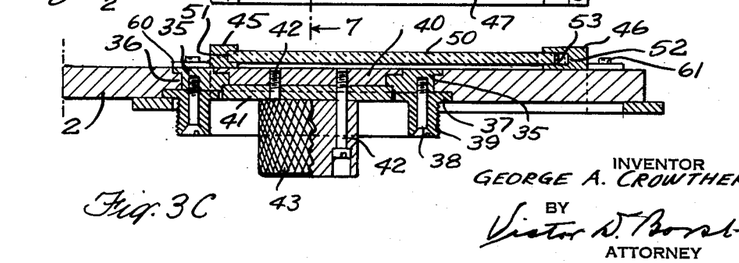
Figures 5, 6, 8:
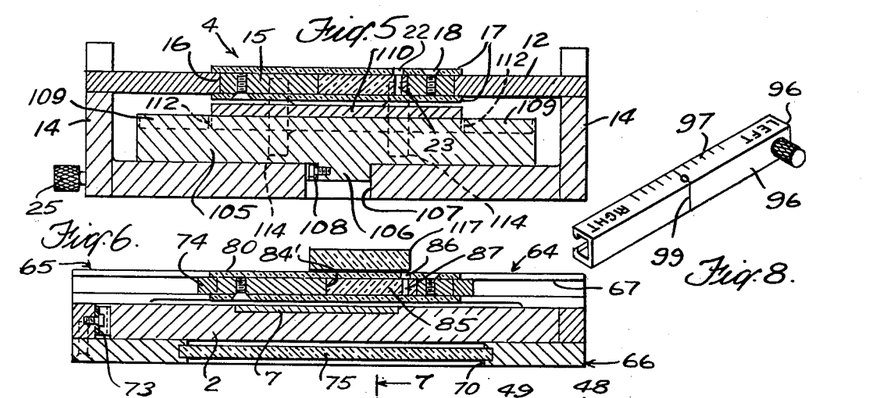
FIG. 5 is a transverse vertical section through the gun dial assembly, the plane of which is indicated by the line 5—5 on FIG. 1A.
FIG. 6 is a transverse vertical section through the target dial assembly, the plane of which is indicated by the line 6—6 on FIG. 1B.
FIG. 8 is a detail perspective view of the deflection spot scale slide mounted on the target dial assembly.
Figure 7:
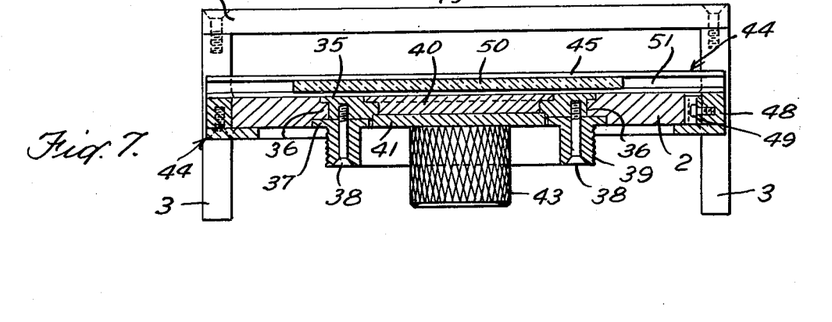
FIG. 7 is a transverse vertical section through the wind dial assembly, the plane of the section being indicated by the line 7—7 on FIG. 1C.
Figure 9:
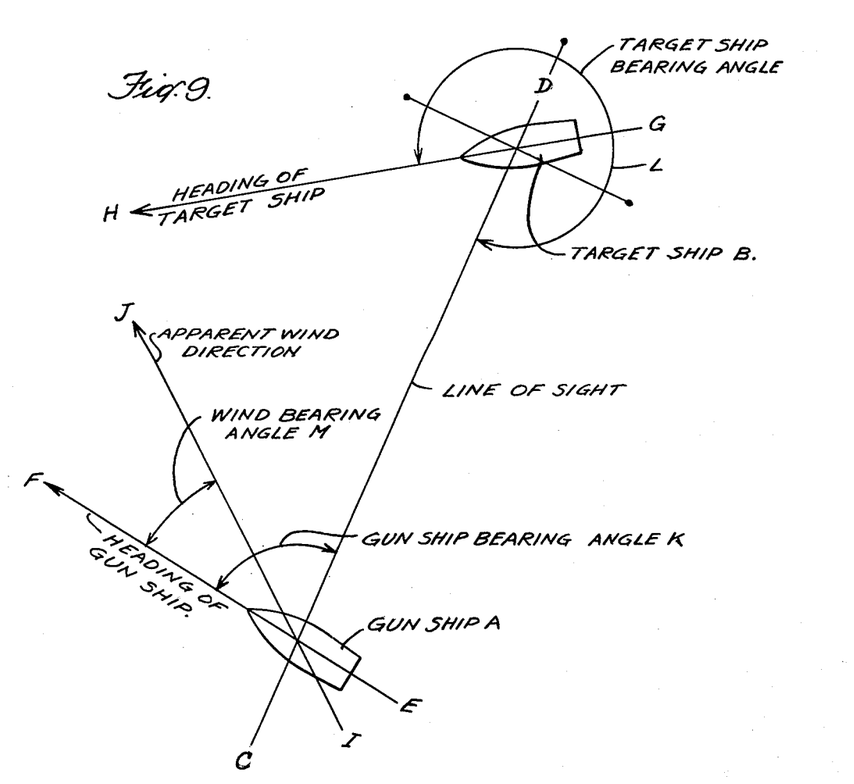
FIG. 9 is a diagram illustrating the factors which must be known in setting the instrument for solving a given problem.
Figure 10:
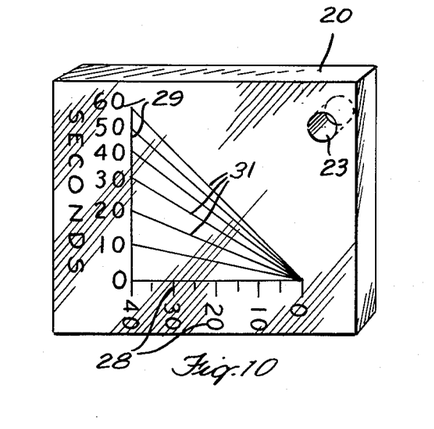
FIG. 10 is an enlarged detail plan view of a slidable block incorporated in the gun ship dial assembly having one scale thereon for indicating the speed of the gun ship and another scale thereon for indicating the time of flight of a projectile between the gun ship and a target ship.
Figure 11:
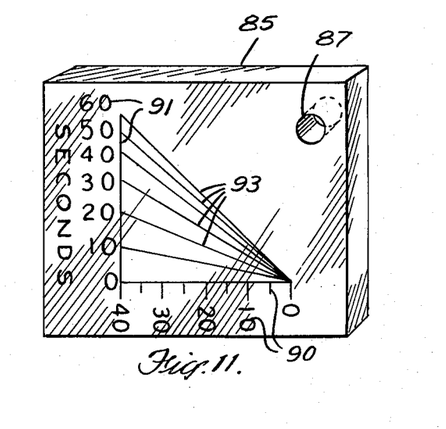
FIG. 11 is an enlarged detail plan view of a slidable block, similar to the block shown in FIG. 10, which is incorporated in the target dial assembly and is provided with one scale for indicating the speed of the target ship and another scale for indicating the time of flight of a projectile between the gun ship and the target ship.

Before describing the construction and operation of the instrument 1 in more detail, reference is had to FIG. 9 in which a typical problem to be solved by the instrument is diagrammatically shown. As shown therein, the gun ship is indicated by A, and the target ship is indicated by B. The line of sight between the gun ship and the target ship is indicated by the line C—D; and the range is the distance in yards between the two ships along the line of sight C—D. The heading of the gun ship is indicated by the line E—F, the heading of the target ship is indicated by the line G—H, and apparent direction of the wind is indicated by the line I—J. The bearing of the gun ship with respect to the line of sight is indicated by the angle K, the bearing of the target ship with respect to the line of sight is indicated by the angle L, and the apparent direction of the wind with respect to the bearing of the gun ship A is indicated by the angle M. All of the foregoing factors must be known in setting the instrument 1 for a given problem. The speed of the gun ship, the speed of the target ship, and the ballistic characteristics of the particular gun being used must also be known.

Referring now to FIGS. 1A, 2A, 3A and 5, the gun dial assembly 4 comprises a rectangular plate 12 which extends from side to side of the base plate 2 and is secured in fixed position, above the base plate 2, by screws 13, to the upper ends of legs 14 carried by the base plate 2 and extending upwardly therefrom at each side thereof. A circular disk 15 is rotatably mounted in a complementary aperture 16 in the plate 12 by means of a pair of thin transparent disks 17, of slightly greater diameter than the disk 15, which are secured to opposite sides of the disk 15 by screws 18. The disk 15 is provided with an elongated rectangular slot 19 in which a transparent block 20 is slidably mounted, the disks 17 also serving to retain the block 20 in the slot 19. The block 20 is adapted to be moved back or forth in the slot 19 by a pin 21 which is inserted through an elongated narrow slot 22 in the upper disk 17 and into an aperture 23 in the block 20 which registers with the slot 22. When not in use the pin 21 is kept in an aperture 24 in the end of the base plate 2, and is retained therein by a screw 25. The disk 15 is provided with a scale 26, calibrated in degrees for indicating the relative gun ship bearing angle K, which is adapted to register with an index mark 27 carried by the plate 12. The block 20 is provided along one side thereof with a scale 28 calibrated in knots for indicating the gun ship speed, and along one end thereof with a scale 29 calibrated in seconds for indicating the time of flight of a projectile between the gun ship and the target ship. The block 20 is also provided with index lines 31 extending between the zero (0) marking on the ship speed scale 28 and the consecutive markings on the time of flight scale 29. The upper disk 17 is provided with an index line 32 for register with the ship speed scale 28.

Referring now to FIGS. 1C, 2C, 3C and 7, the wind dial assembly 5 comprises a ring 35 which is rotatably mounted in a complementary aperture 36 in the base plate 2 and is retained therein by a ring 37, which is secured to the lower face of the ring 35 by screws 38 and is provided with a downwardly extending knurled annular flange 39 by which the ring 35 is adapted to be rotated. A circular disk 40 is rotatably mounted in the ring 35 and is retained therein by a disk 41 which is secured to the lower face of the disk 40 by screws 42 which also serve to secure a knurled knob 43 thereto, by which knob the disk 40 is adapted to be rotated.

A frame, generally indicated by the numeral 44 is slidably mounted for longitudinal movement on the base plate 2 in cooperative relation with the rotatably mounted ring 35 and disk 40. The slide 44 comprises a pair of spaced parallel transversely extending side rails 45 and 46 which are connected together at one end thereof by a bar 47 which frictionally engages one side of the base plate 2, and at the other end thereof by a bar 48 which is spaced from the opposite side of the base plate 2. A resilient spring member 49 which is secured to the bar 48 is interposed between the bar 48 and the adjacent side of the base plate 2 for yieldingly holding the frame 44 in adjusted position. A transparent plate 50 is slidably mounted for transverse movement in grooves 51 and 52 in the side rails 45 and 46, respectively. A spring member 53 is provided in the groove 52 for yieldingly holding the plate 50 in adjusted position.

The ring 35 is provided with a scale 54 calibrated in degrees which is adapted to register with an index mark 54ᵃ on the base 50 for indicating the gun ship bearing, and the disk 40 is provided with an index mark 55 for register with the scale 54 in indicating the apparent wind bearing angle M. The disk 40 is also provided with a scale 56 calibrated in knots for indicating the wind speed, and the plate 50 is provided with an index dot 57 for register with the wind speed scale 56. The rail 46 is provided with a drop and add range wind scale 58 calibrated in knots, and the plate 50 is provided with an index mark 59 for register with the scale 58. The frame 44 is also provided with index marks 60 and 61 for register with right and left wind deflection scales 62 and 63, respectively, which are disposed on the base plate 2 and are calibrated in knots.

Referring now to FIGS. 1B, 2B, 3B, and 6, the target dial assembly 6 comprises a slide 64 which is mounted on the base plate 2 for longitudinal movement in cooperative relation with the scale 9 and 10. The slide 64 includes an upper frame 65 which is disposed adjacent the top surface of the base plate 2, and a lower frame 66 which is disposed adjacent the bottom surface of the base plate 2. The upper frame comprises a pair of spaced parallel transversely extending rails 67 and 68, and the lower frame 66 consists of a rectangular plate 69 having a rectangular aperture 70 therein. The rails 67 and 68 are connected together and to the lower frame plate 69, at one end thereof, by a bar 71 which frictionally engages one side of the base plate 2. The other ends of the rails 67 and 68 are connected together, and to the lower frame plate 69, by a bar 72 which is slightly spaced from the opposite side of the base plate 2. A resilient spring member 73, which is secured to the bar 72, is interposed between the bar 72 and the adjacent side of the base plate 2 for yieldingly holding the slide 64 in adjusted positions.

A rectangular plate 74 is slidably mounted on the upper frame for transverse movement thereon; and a transparent plate 75 is slidably mounted in the aperture 70 of the lower frame 66 for longitudinal movement therein. One side of the plate 74 is disposed in a groove 76 in rail 67 and the opposite side of the plate 74, which overhangs the rail 68, is provided with slot 77 for reception of the rail 68. A spring member 78, similar to the spring members 49 and 73, which is secured to the plate 74 within the slot 77 in frictional engagement with the rail 68, is provided for maintaining the plate 74 on the frame 65 and for yieldingly holding the plate 74 in adjusted positions.

A circular disk 80, similar to the disk 15, is rotatably mounted in a complementary aperture 81 in the plate 74 by means of a pair of thin transparent disks 82 and 83, of slightly greater diameter than the disk 81, which are secured to opposite sides of the disk 81 by screws 84. The disk 80 is provided with an elongated rectangular slot 84' in which a transparent block 85, similar to the block 20, is slidably mounted, the disks 82 and 83 also serving to retain the block 85 in the slot 84'. The block 85 is adapted to be moved back and forth in the slot 84' by the pin 21 which is inserted through an elongated narrow slot 86 in the upper disk 82 and into an aperture 87 in the block 85 which registers with the slot 86. The disk 80 is provided with a scale 88, calibrated in degrees for indicating the relative target ship bearing angle L, which is adapted to register with an index mark 89 carried by the plate 74. The block 85 is provided, along one side thereof, with a scale 90 calibrated in knots for indicating the target ship speed, and along one end thereof with a scale 91 calibrated in seconds for indicating the time of flight of a projectile between the gun ship and the target ship. The block 85 is also provided with index lines 93 extending between the zero (0) marking on the ship speed scale 90 and the consecutive marking on the time of flight scale 91. The upper disk 82 is provided with an index line 94 for register with the target ship speed scale 90. The plate 75 which is mounted in the lower frame 66 is provided with an index line 95 for register with the range scales 9 and 10. The overhanging side of the plate 74 is provided with a slide 96 having a scale 97 calibrated to the right and left in yards. The slide 96 is provided with an index mark 99 (see FIG. 8) for register with the scale 8 on the base plate 2; and the plate 74 is provided with an index mark 100 for register with the scale 97 on the slide 96. The lower frame plate 69 is provided with a drop and add scale 98, calibrated in yards for register with the index line 75'. The scales 97 and 98 are provided for use in further setting the target dial assembly in accordance with an observed error in the landing of a projectile to the right or left of the target, and/or beyond or short thereof.

Referring now to FIGS. 1A, 1B, 3A, 3B and 5, the protractor assembly 11 comprises a block 105 which is mounted on the base plate 2 under the gun ship assembly 4, for longitudinal movement thereon, by means of a centrally disposed longitudinally extending tongue 106 which extends downwardly from the block 105 and into a longitudinally extending slot 107 in the base plate 2. A spring member 108 which is secured to the tongue 106 within the slot 107 is provided for yieldingly holding the block 105 in adjusted positions. The block 105 is also provided with a transversely extending tongue 109 which extends upwardly from the top of the block. A protractor holder 110 is mounted on the top of the block 105, for transverse movement thereon, by means of a slot 111 in which the tongue 109 is received. A spring member 112, similar to the spring member 108, which is secured to the holder 110 within the slot 111 is provided for yieldingly holding the protractor holder in adjusted positions. The rear end of the protractor holder 110 is provided with a finger grip 114 by which the protractor holder 110 may be moved transversely on the block 105, and the block 105 moved longitudinally on the base plate 2. The forward end of the protractor holder 110 is provided with an arcuate receiving section 115 in which a transparent protractor disk 116 is rotatably mounted. An elongated narrow transparent protractor arm 117, which is integral with the protractor disk 116, extends forwardly from the protractor disk 116 over and past the target dial assembly 6 and under a transversely extending keeper bar 118. When the instrument is turned over for setting the target dial assembly 6 in connection with the scales 9 and 10, the keeper bar 118 and extensions 119 at one end of the legs 14 provide supporting means therefor. The protractor holder is provided with an index dot 120 which cooperates with the gun dial assembly 4 in setting the protractor assembly. The protractor disk 116 is provided with an index mark 121 which cooperates with a scale 122 on the protractor holder in indicating the deflection angle. The protractor arm is provided with a longitudinally extending index line 123 on one side of which is disposed a sight angle scale 124 and on the other side of which is disposed a time of flight scale 125. The scale 124 is calibrated in minutes in which 2000 equals zero; the scale 122 is calibrated in mils in which 500 equals zero, and the scale 125 is calibrated in seconds.

The operation of the instrument 1 in determining the sight and deflection angles of a gun of known ballistic characteristics for a given problem will now be described in connection with FIG. 9 and a typical problem in which the range or distance of the target ship B from the gun ship A along the line of sight C—D is 15,000 yards; the relative bearing angle K of the gun ship with respect to the line of sight C—D is 85°; the direction of the apparent wind is away from gun ship at a 40° angle M with respect to the bearing of the gun ship; the speed of the gun ship is 30 knots and the wind speed is 20 knots; the relative bearing angle L of the target ship with respect to the line of sight C—D is 315°; and the speed of the target ship B is 30 knots. In solving the foregoing problem the disk 15 of the gun ship dial assembly 4 is set with the angle 85 of the scale 26 thereon in register with the index mark 27; and the block 20 is moved to a position where 30 on the gun ship speed scale 28 registers with the index line 32 on the upper disk 17.

The ring 35 of the wind dial assembly 5 is set with the angle 85° on the scale 54 in register with the index mark 54ª on the base plate 2. The disk 40 is then rotated to bring the index mark 55 thereon into register with 40 on the scale 54. The slide 44 and the plate 50 carried thereby are then moved to such positions that the index dot 57 on the plate 50 registers with 20 on the wind speed scale 56. When set in this manner, the index mark 59 on the plate 50 will register with 15 on the drop side of the scale 58, and the index mark 60 on the slide 44 will register with the number 20 of the scale 62 on the base plate 2.

In setting the target dial assembly 6 the zero (0) mark of the scale 97 on the spot slide 96 is first set in register with the index mark 100 on the plate 74, and the plate 75 carried by lower frame 66 of the slide 64 is set with the index line 95 thereon in register with the zero (0) marking on the range spot scale 98 on the frame 66. The slide 64 is then shifted until the index line 95 on the plate 75 intersects the 15,000 yard line of the range scale 9 midway between the drop lines 10 and 20 of the range wind scale 10, in accordance with a reading taken from the scale 58 of the wind dial assembly 5. The disk 80 is then rotated until the 315° marking of the scale 88 on the disk 80 registers with the index mark 89 on the plate 74, after which the block 85 is moved to a position where 30 on the target ship speed scale 90 registers with the index line 94. The plate 74 is then shifted until the index mark 99 on the spot slide 96 registers with the 20 line on the right of the cross wind scale 8 in accordance with a reading taken from the scale 62 of the wind dial assembly.

The protractor assembly is then shifted longitudinally, transversely, and arcuately until the index dot 120 on the protractor holder 110 registers with one of the time of flight scale lines 31 on the block 20 of the gun ship dial assembly 4, and the same time of flight line 93 on the block 85 of the target dial assembly 6 registers with the same time of flight marking of the scale 125 on the protractor arm 117. For example, if the dot 120 registers with the 50 second line 31 on the block 20, the 50 second marking on the scale 125 must register with the 50 second line 93 on the block 85. The sight angle is then read from the scale 124 where the index line 123 on the protractor arm 117 intersects the time of flight line 93 on the block 85; and the deflection angle is read from the scale 122 opposite the index mark 121. For the foregoing illustrative problem the sight angle as read from the scale 124 is 3375, and the deflection angle as read from the scale 122 is 508.

Now let it be assumed that a shell shot from a gun so set was observed to overshoot the target by 200 yards. The plate 75 is then shifted until the index line 95 thereon registers with the 200 yard marking on the drop side of the scale 98 which changes the previous setting of the target dial assembly with respect to the range scale 9. The slide 64 is shifted longitudinally along the base 2 until the index line 95 on the plate 75 again intersects the 15,000 yard line of the range scale 9 midway between the drop lines 10 and 20 of the range wind scale 10 which changes the previous setting of the protractor assembly with respect to the target dial assembly. The protractor assembly is then re-set in the manner described. The sight angle will now read 3295 and the deflection angle will still read 508. Now let it be assumed that a shell shot from a gun so set (3375 and 508) was observed to land 200 yards to the right of the target. The spot slide 96 would then be shifted until the index mark 100 on the plate 74 registered with the 200 yard marking on the right side of the scale 97, and then the plate 74 shifted until the index mark 99 on the slide 96 was again in proper register with the scale 8 in accordance with the reading of the wind dial assembly. The protractor assembly would then be re-set in the manner described. The deflection angle will now read 478, and the sight angle will still read 3375. Let it further be assumed that a shell shot from a gun so set (3375 and 508) overshot the target 200 yards and 200 yards to the right thereof. The two re-settings just described would first be made and then the protractor assembly re-set in the manner described. The sight angle would then read 3295 and the deflection angle 478.

From the foregoing it will be apparent to those skilled in this art that I have provided a relatively simple mechanism for accomplishing the objects of the invention, and it is to be understood that I am not limited to the specific construction shown and described herein as various modifications may be made therein within the spirit of the invention and the scope of the appended claims.

What is claimed is:

1. In an instrument for computing the elevation and deflection angles for directing the fire of a heavy gun of known ballistics which is mounted upon a ship, which instrument comprises; a base; a settable gun dial assembly mounted on said base, scales carried by said gun dial assembly by which said gun dial assembly may be set in accordance with the known relative gun ship bearing with respect to a target, the known speed of the gun ship, and the known time of flight of a projectile between the gun ship and the target; a settable target dial assembly mounted on said base adjacent said gun dial assembly, scales carried by said target dial assembly by which said target dial assembly may be set in accordance with the known relative target bearing with respect to the gun ship, the known speed of movement of the target, and the known time of flight of a projectile between the gun ship and the target; and a settable ballistic protractor assembly mounted on said base for longitudinal, transverse and rotary movement in cooperative relation to said gun dial assembly and said target dial assembly; said protractor assembly having an index mark which is adapted to be brought into register with the time of flight scale carried by the gun dial assembly in accordance with the known time of flight, and a time of flight scale which is adapted to have the known time of flight marking thereon brought into register with the known time of flight marking on the time of flight scale carried by the target dial assembly, said protractor assembly also having scales for indicating the elevation and deflection angles for a known time of flight when the protractor assembly is so set in conjunction with the settings of the gun dial and target dial assemblies.

2. In an instrument as defined in claim 1 in which said gun dial assembly comprises a transversely extending rectangular plate which is secured in fixed position above said base and is provided with an enlarged circular aperture, a circular disk of transparent material rotatably mounted in said aperture, an elongated rectangular slot in said disk, a block slidably mounted in said slot, said disk having a scale calibrated in degrees for indicating the relative gun ship bearing, and said block having a scale calibrated in knots for indicating the speed of the gun ship and a scale calibrated in seconds for indicating the time of flight of a projectile between said ship and a target.

3. In an instrument as defined in claim 1 in which said protractor assembly comprises a longitudinally movable slide mounted on said base under said gun dial assembly, a protractor holder mounted on said slide for transverse movement with respect thereto, a protractor disk rotatably mounted on said protractor holder, an elongated protractor arm carried by said protractor disk and extending outwardly therefrom over said target dial assembly, an index mark on said protractor disk which is adapted to register with a sight deflection scale on said protractor holder for indicating the deflection angle, and a scale on said protractor arm which is adapted to register with indicia carried by said target dial assembly for indicating the elevation angle.

4. In an instrument as defined in claim 1 in which said target dial assembly comprises an upper frame which is disposed adjacent the upper face of said base and a lower frame which is disposed adjacent the lower face of said base, said frames being connected together at the ends thereof for longitudinally sliding movement in unison on said base; a rectagular slide mounted in said upper frame for transverse movement with respect to said base, a circular disk rotatably mounted in a complementary aperture in said slide, an elongated slot in said disk, a block slidably mounted in said slot, said disk having a scale calibrated in degrees for indicating the relative target bearing, and said block having a scale calibrated in knots for indicating the target speed and a scale calibrated in seconds for indicating the time of flight of a projectile between said ship and target, index marks carried by said slide for register with said scales; a second slide which is mounted in said lower frame for longitudinal movement with respect to said base, and index marking on said second slide for register with a longitudinally extending present range scale and a cooperating transversely extending range wind scale disposed on the lower face of said base.

5. In an instrument as defined in claim 4 in which the upper face of said base is provided with a longitudinally extending range wind scale by which said target dial assembly is further set in accordance with known wind data.

6. In an instrument as defined in claim 5 in which said slide is also provided with a transversely adjustable scale calibrated in yards, and said lower frame is provided with a fixed similar scale, said scales being provided for further setting said target dial assembly in accordance with an observed error in the landing of a projectile with respect to the target.

7. In an instrument, for computing the elevation and deflection angles for directing the fire of a heavy gun of known ballistics, which is mounted upon a ship and comprises a base, a gun dial assembly mounted on said base, a target dial assembly mounted on said base adjacent said gun dial assembly, and a ballistic protractor assembly mounted on said base in cooperative relation to said gun dial assembly and said target dial assembly, said assemblies being provided with cooperating scales by which they are settable in accordance with known ship, gun, target and wind conditions; said gun dial assembly comprising a transversely extending rectangular plate which is secured in fixed position above said base and is provided with an enlarged circular aperture, a circular disk of transparent material rotatably mounted in said aperture, an elongated rectangular slot in said disk, a block slidably mounted in said slot, said disk having a scale calibrated in degrees for indicating the relative gun ship bearing, and said block having a scale calibrated in knots for indicating the speed of the gun ship and a scale calibrated in seconds for indicating the time of flight of a projectile between said ship and a target; said target dial assembly comprises an upper frame which is disposed adjacent the upper face of said base and a lower frame which is disposed adjacent the lower face of said base, said frames being connected together at the ends thereof for longitudinal sliding movement in unison on said base; a rectangular slide mounted in said upper frame for transverse movement with respect to said base; a circular disk rotatably mounted in a complementary aperture in said slide, an elongated slot in said disk, a block slidably mounted in said slot, said disk having a scale calibrated in degrees for indicating the relative target bearing, and said block having a scale calibrated in knots for indicating the target speed and a scale calibrated in seconds for indicating the time of flight of a projectile between said ship and target, index marks carried by said slide for register with said scales; a second slide which is mounted in said lower frame for longitudinal movement with respect to said base, and index marking on said second slide for register with a longitudinally extending present range scale and a cooperating transversely extending range wind scale disposed on the lower face of said base; said protractor assembly comprises a longitudinally movable slide mounted on said base under said gun dial assembly, a protractor holder mounted on said slide for transverse movement with respect thereto, a protractor disk rotatably mounted on said protractor holder, an elongated protractor arm extending outwardly from said disk over said target dial assembly, an index mark on said protractor disk which is adapted to register with a sight deflection scale on said protractor holder for indicating the deflection angle, and a scale on said protractor arm which is adapted to register with indicia carried by said target dial assembly for indicating the elevation angle; said protractor assembly also having an index mark on said protractor holder which is adapted to be brought into register with the time of flight scale carried by said gun dial assembly in accordance with the known time of flight, a time of flight scale on said elongated arm which is adapted to have the known time of flight markings thereon brought into register with the known time of flight marking on the time of flight scale carried by said target dial assembly, and said elongated arm also having a scale thereon for indicating the elevation angle for a known time of flight when the protractor assembly is so set in conjunction with the gun dial and target dial assemblies.

8. In an instrument as defined in claim 7 in which the upper face of said base is provided with a longitudinally extending range wind scale by which said target dial assembly is further set in accordance with known wind data.

9. In an instrument as defined in claim 8 in which said slide is also provided with a transversely adjustable scale calibrated in yards, and said lower frame is provided with a fixed similar scale, said scales being provided for further setting said target dial assembly in accordance with an observed error in the landing of a projectile with respect to the target.

References Cited in the file of this patent

UNITED STATES PATENTS

| | | |
|---|---|---|
| 1,409,303 | Lewis | Mar. 14, 1922 |
| 1,569,190 | Krupp | Jan. 12, 1926 |
| 1,843,978 | Hensey | Feb. 9, 1932 |
| 2,099,713 | Willson | Nov. 23, 1937 |
| 2,363,173 | Fuller | Nov. 21, 1944 |
| 2,703,677 | Harnwell | Mar. 8, 1955 |

FOREIGN PATENTS

| | | |
|---|---|---|
| 127,052 | Great Britain | May 29, 1919 |
| 708,101 | France | Apr. 27, 1931 |